US011839005B2

(12) United States Patent
Squillace et al.

(10) Patent No.: US 11,839,005 B2
(45) Date of Patent: Dec. 5, 2023

(54) CONTROLLER FOR CONTROLLING A LIGHTING UNIT OF A LIGHTING SYSTEM AND A METHOD THEREOF

(71) Applicant: SIGNIFY HOLDING B.V., Eindhoven (NL)

(72) Inventors: Jorge Gabriel Squillace, Eindhoven (NL); Remco Magielse, Tilburg (NL); Kevin Thomas Worm, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/631,630

(22) PCT Filed: Aug. 3, 2020

(86) PCT No.: PCT/EP2020/071822
§ 371 (c)(1),
(2) Date: Jan. 31, 2022

(87) PCT Pub. No.: WO2021/023716
PCT Pub. Date: Feb. 11, 2021

(65) Prior Publication Data
US 2022/0279641 A1    Sep. 1, 2022

(30) Foreign Application Priority Data
Aug. 6, 2019 (EP) .................................. 19190189

(51) Int. Cl.
*H05B 47/14*    (2020.01)
*H05B 47/115*    (2020.01)

(52) U.S. Cl.
CPC ........... *H05B 47/115* (2020.01); *H05B 47/14* (2020.01)

(58) Field of Classification Search
None
See application file for complete search history.

(56) References Cited

U.S. PATENT DOCUMENTS 9,113,513 B1 *   8/2015  Jungwirth ............. H05B 45/46
10,129,965 B2   11/2018  Bosua et al.
(Continued)

FOREIGN PATENT DOCUMENTS

WO    2018052572 A1    3/2018

OTHER PUBLICATIONS

Eltako (GmbH) Electronics, "Wireless Actuator Dimmer Switch Controller, FSG71/1-10V for Electronic Ballast Units 1-10V".

*Primary Examiner* — Dedei K Hammond

(57) ABSTRACT

A method (400) of controlling a lighting unit (110) of a lighting system (100a, 100b) is disclosed. The lighting system (100a, 100b) comprises the lighting unit (110) and a lighting control device (120) comprising a user input element (122) for receiving a continuous user input for changing an intensity of the light output of the lighting unit (110). The method (400) comprises receiving (402) a signal indicative of the continuous user input, obtaining (404) one or more parameters, the one or more of parameters comprising at least a current light setting of the lighting unit (110), the current light setting having an intensity level between a predefined maximum intensity level and a predefined minimum intensity level, and controlling the intensity of the light output of the lighting unit (110) over time while the continuous user input is being provided, wherein the intensity of the light output is either increased or decreased based on the one or more parameters.

15 Claims, 3 Drawing Sheets

100a

100b (56) References Cited

U.S. PATENT DOCUMENTS

| | | |
|---|---|---|
| 10,143,068 B2 | 11/2018 | Karc et al. |
| 2007/0126368 A1 | 6/2007 | McDonough et al. |
| 2020/0359485 A1* | 11/2020 | Marshall ................ H05B 47/11 |

* cited by examiner

CONTROLLER FOR CONTROLLING A LIGHTING UNIT OF A LIGHTING SYSTEM AND A METHOD THEREOF

CROSS-REFERENCE TO PRIOR APPLICATIONS

This application is the U.S. National Phase application under 35 U.S.C. § 371 of International Application No. PCT/EP2020/071822, filed on Aug. 3, 2020, which claims the benefit of European Patent Application No. 19190189.1, filed on Aug. 6, 2019. These applications are hereby incorporated by reference herein.

FIELD OF THE INVENTION

The invention relates to a method of controlling a lighting unit of a lighting system, the lighting system comprising the lighting unit and a lighting control device comprising a user input element for receiving a continuous user input for changing an intensity of the light output of the lighting unit. The invention further relates to a computer program product for executing the method. The invention further relates to a controller for controlling a lighting unit of a lighting system, the lighting system comprising the lighting unit and a lighting control device comprising a user input element for receiving a continuous user input for changing an intensity of the light output of the lighting unit.

BACKGROUND

Smart lighting systems enable users to control lighting units in an environment, such as the user's home. Such smart lighting systems may comprise multiple lighting units and lighting control devices (such as light switches and smartphones) connected to the lighting units. Some types of lighting control devices have a limited number of user input elements. Some light switches, for example, may have only a single button. This single button may, for example, be configured such that a user can toggle one or more lighting units on and off by pressing the button. Such a button may further be configured to receive a press-and-hold input, which may be associated with a dimming control command, and the one or more lighting units may be dimmed while the user continuously presses and holds the button.

U.S. Pat. No. 9,113,513 B1 discloses controlling changes in light intensity by an illumination system by receiving desired dimming signals, sampling the signals, and changing the output drive signal driving the illumination system by the change increment, until the light intensity emitted by the illumination system substantially matches the desired light intensity indicated by the dimming signal. Pressing and holding a switch closed for more than a specified time period, for example 1 second, signals the microcontroller to enter a dimming mode in which it automatically dims the light-emitting element output by changing the PWM duty cycle from 100% down to 1% over a set time period, for example 3 seconds. Releasing the switch and then repeating the press-and-hold action may signal the microcontroller to reverse the dimming direction and in-crease the light output by changing the PWM duty cycle from 1% up to 100%. The PWM increment may automatically change based on the actual duty cycle or light level. For example, when the duty cycle is below about 2%, the PWM increment may be 1 bit, and when the duty cycle is between about 2% and about 5%, the PWM increment may be 2 bits, and when the duty cycle is above about 5%, the PWM increment may be 4 bits.

SUMMARY OF THE INVENTION

In current systems, the above-mentioned press-and-hold input either increases the intensity of the light output of the lighting unit, or it decreases the intensity of the light output. The inventors have realized that it may be desirable that such a single input element may be used for both increasing and decreasing the intensity of the light output depending on the user's needs. It is therefore an object of the present invention to provide a method and a controller that enable advanced dimming control by providing a single input.

According to a first aspect of the present invention, the object is achieved by a method of controlling a lighting unit of a lighting system, the lighting system comprising the lighting unit and a lighting control device comprising a user input element for receiving a continuous user input for changing an intensity of the light output of the lighting unit, the method comprising:

receiving a signal indicative of the continuous user input,
obtaining one or more parameters, the one or more of parameters comprising at least a current light setting of the lighting unit, the current light setting having a current intensity level between a predefined maximum intensity level and a predefined minimum intensity level, and
controlling the intensity of the light output of the lighting unit over time while the continuous user input is being provided, wherein the intensity of the light output is either increased or decreased based on the one or more parameters.

The intensity of the light output of the lighting unit is controlled while the continuous user input is received. The continuous user input may, for example, be a press and hold user input provided by pressing and holding a button of a lighting control device. The light output is either increased or decreased based on the one or more parameters. The method may further comprise determining whether to increase or decrease the intensity based on the one or more parameters. The one or more parameters include at least a current light setting of the lighting unit, the current light setting having a current intensity level between a predefined maximum intensity level and a predefined minimum intensity level. The predefined maximum intensity may, for example, be a 100% intensity, and the predefined minimum intensity may, for example, be off. Thus, if the current intensity is between the maximum and the minimum intensity of the lighting unit, the intensity of the light output of the lighting unit is either increased or decreased over time based on the current intensity. If, for example, the current intensity is high (e.g. 90% of the maximum intensity), the intensity may be decreased while the user is providing the continuous user input, and if, for example, the current intensity is low (e.g. 10% of the maximum intensity), the intensity may be increased while the user is providing the continuous user input. This is beneficial, because the such a single input element may be used for both increasing and decreasing the intensity of the light output depending on the (expected) user's needs, thereby providing advanced dimming control by providing a single input.

The one or more parameters may further comprise a current time. The current time may, for example, be a current time of day, a day in the week, month or a period/day of the year, season, etc. Thus, the determination whether to increase or decrease may be further based on the current time. A user may, for example, desire to increase the intensity early in the evening and decrease the intensity later in the evening. This is beneficial, because even more advanced dimming controls are enabled by providing a single input.

The one or more parameters may further comprise a location of the lighting unit. The location may, for example, be a geographical location, a location in a building (e.g. specific a room or space), a location in a room or a space (e.g. at the ceiling, on the floor, in a corner, in the center of a room, etc.), a location relative to another device or object (e.g. a tv, a table, etc.), etc. Thus, the determination whether to increase or decrease the intensity may be further based on the location of the lighting unit. A user may, for example, desire to increase the intensity of lighting units located in the living room, and decrease the intensity of lighting units in the bedroom. This is beneficial, because even more advanced dimming controls are enabled by providing a single input.

The method may further comprise: ceasing increasing or decreasing the intensity when the continuous user input is no longer being provided. Thus, when the user no longer provides the continuous input, the increase or decrease of the intensity is stopped, and the intensity is set to its current intensity level. This enables a user to select the desired intensity, simply by no longer providing the continuous user input.

The method may further comprise: when the intensity reaches the predefined maximum intensity level while the continuous user input is being provided, decreasing the intensity over time while the continuous user input is being provided, and when the intensity reaches the predefined minimum intensity level while the continuous user input is being provided, increasing the intensity over time while the continuous user input is being provided. For example, when the intensity is being increased, and the predefined maximum intensity is reached, the intensity may be decreased (as long as the continuous user input is provided). This enables a user to cycle through the dimming levels by providing the continuous user input. This is beneficial, because even more advanced dimming controls are enabled by providing a single input.

The method may further comprise, when the continuous user input is no longer received:
  receiving a second signal indicative of a second continuous user input received via the same user input element, and
  if the intensity was being decreased while the continuous user input was being provided, increasing the intensity over time while the second continuous user input is being provided, and
  if the intensity was being increased while the continuous user input was being provided, decreasing the intensity over time while the second continuous user input is being provided. This enables a user to stop providing the continuous user input (e.g. by releasing the button), and subsequently providing a second continuous user input (e.g. by pressing and holding the button again), whereupon the intensity change is reversed (from increase to decrease, or vice versa). This enables even more advanced dimming control via a single input element.

The predefined minimum and maximum intensity levels may be minimum and maximum intensity levels of the lighting unit. The predefined maximum intensity may, for example, be a 100% intensity, and the predefined minimum intensity may, for example, be off.

The predefined minimum and maximum intensity levels may be based on a light intensity profile. The light intensity profile may, for example, be a dimming curve defining a plurality of dimming values, according to which the lighting unit may be controlled.

The method further may further comprise:
  entering a learning mode, to learn, over a period of time, associations between user inputs indicative of changes of the intensity of the light output of one or more lighting units and one or more current parameters,
  switching to a control mode, and
  executing the steps of any one of the above-mentioned methods, wherein the method further comprises: determining whether to increase or decrease the intensity of the light output based on the learned associations. In other words, user preferences related to parameters (e.g. current light settings, time of day, location of the lighting units, etc.) may be monitored during a monitoring period. These user preferences may then be used to determine whether to increase or decrease the intensity of the light output. This is beneficial, because the dimming control is tailored to a specific user's preferences.

The lighting control device may be a light switch, and the continuous user input may be received by actuating and holding a button of the light switch. The button may, for example, be a press or touch button. In another example, the lighting control device may be a personal device, such as a smartphone, and the continuous user input may be received by actuating and holding a touch sensitive display of the personal device. In another example, the lighting control device may be an augmented reality device, and the continuous user input may be a gaze of a user towards a certain lamp, detected by for example a camera comprised in the augmented reality device. In another example, the lighting control device may comprise an audio sensor, and the continuous user input may be a continuous sound created by the user, detected by the audio sensor.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for controlling a lighting unit of a lighting system, the lighting system comprising the lighting unit and a lighting control device comprising a user input element for receiving a continuous user input for changing an intensity of the light output of the lighting unit, the controller comprising:
  a communication unit for receiving a signal indicative of the continuous user input,
  a processor configured to control the intensity of the light output of the lighting unit, wherein the processor is further configured to:
  obtain one or more parameters, the one or more of parameters comprising at least a current light setting of the lighting unit, the current light setting having an intensity level between a maximum intensity level and a minimum intensity level of the lighting unit, and
  controlling the intensity of the light output of the lighting unit over time while the continuous user input is being provided, wherein the intensity of the light output is either increased or decreased based on the one or more parameters.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
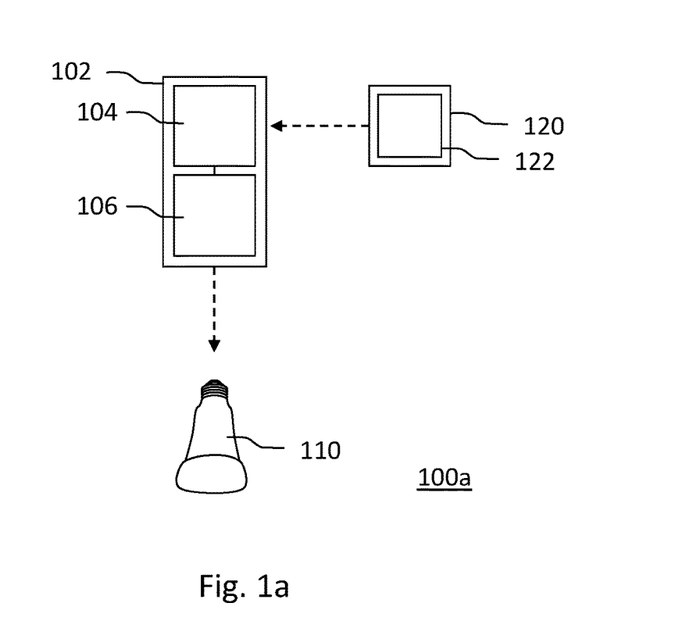
FIG. 1a shows schematically an embodiment of a lighting system comprising a lighting unit, a lighting control device and a controller for controlling the lighting device.
Figure 1B:
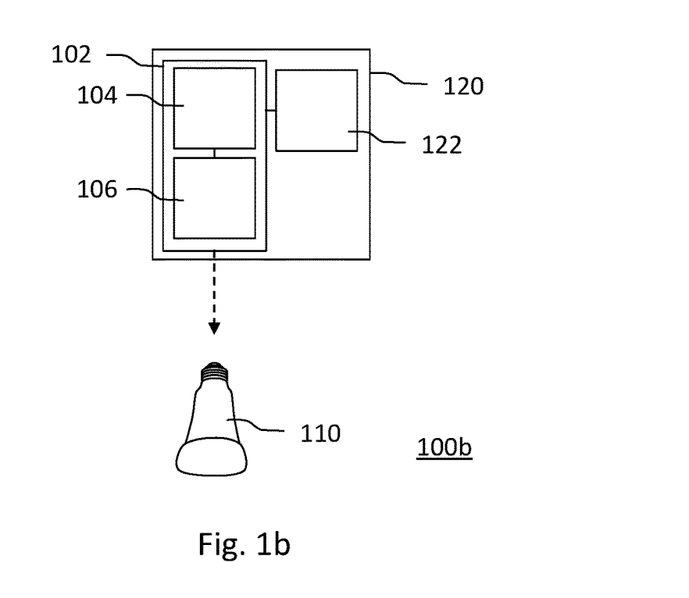
FIG. 1b shows schematically an embodiment of a lighting system comprising a lighting unit, and a lighting control device comprising a controller for controlling the lighting device.

FIGS. 1a and 1b show exemplary systems 100a, 100b comprising a controller 102 for controlling a lighting unit 110 based on user inputs received from a user input element 122 of a lighting control device 120. The user input may be a continuous user input for changing an intensity of the light output of the lighting unit 110. In the example of FIG. 1a, the lighting control device 120 and the controller 102 are different devices. The controller 102 may, for example, be comprised in a smartphone, in a bridge device, in a central home/lighting control system, in the lighting unit 110, on a remote server (e.g. in the cloud), etc. Alternatively, as illustrated in FIG. 1b, the controller 102 may be comprised in the lighting control device 120. The controller 102 comprises a communication unit 104 configured to receive signals indicative of user inputs from the lighting control device 120, and a processor 106 (e.g. a microcontroller, circuitry, a microchip, etc.).

The processor 106 is configured to obtain one or more parameters. These parameters may be contextual parameters that provide information about the context (e.g. the environment) wherein the lighting unit 110 is located. The one or more parameters may be received form external devices (e.g. via the communication unit 104), from one or more sensors (which may be located remotely or comprised in the controller 102), etc. The one or more of parameters may comprise a current light setting of the lighting unit 120, the current light setting being the light setting of the lighting unit 110 at the moment the user input has been received (e.g. at the moment the user actuates a button). The current light setting may be determined in various ways, for example by transmitting a status request message to the lighting unit 110, by transmitting a status request message to a central control system (e.g. a hub, a bridge) connected to the lighting unit 110, by accessing a memory storing information about a last-sent command that has been transmitted to the lighting unit 110, etc. The current light setting may have an intensity level between a predefined maximum intensity level and a predefined minimum intensity level. The current light setting may, for example, have an intensity level between 0% and 100% (e.g. 40%). The processor 106 is further configured to control the intensity of the light output of one or more lighting units 110 over time while the continuous user input is being provided. The processor 106 may determine whether to increase or decrease the intensity of the light output of the one or more lighting units 110 based on the one or more (contextual) parameters. When, for example, a user actuates and holds the user input element 122 of the lighting control device 120, the processor 106 may for example determine that the current intensity of the light output of the lighting unit 110 is 20%, and receive one or more signals from the lighting control device 120 indicative of the continuous user input. Based on the intensity level of 20%, the processor 106 may, for example, determine to increase the intensity of the light output lighting unit 110 while the user is providing the continuous user input. When the user stops providing the continuous input, the controller 102 may cease increasing the intensity and set the intensity to the last (current) intensity level.

The processor 106 may be further configured to determine whether to increase or decrease the intensity of the light output of the lighting unit 110 based on one or more light current light intensities of one or more further lighting units. If, for example, one or more further lighting units have a current intensity different (e.g. higher) from the current intensity of the lighting unit 110 that is to be controlled, the processor 106 may be configured to determine to control the intensity over time while the continuous user input is being received such that the intensity level of the lighting unit 110 increases or decreases towards the current intensities of the one or more further lighting units. In another example, the processor may be configured to control a group of lighting units comprising the lighting unit 110 and one or more further lighting units, and the processor 106 may determine to increase/decrease the intensity of the light output of the individual lighting units of the group of lighting units based on the current intensities of the lighting units of the group of lighting units. The processor 106 may, for example, determine to increase the intensity of all lighting units of the group when their average intensity is low. The processor 106 may, for example, determine to increase the intensity of some lighting units of the group that have a lower intensity than an average intensity of the group, and decrease the intensity of some lighting units of the group that have a higher intensity than the average intensity of the group, in order to reach a common e.g. (average or target) intensity level. If the group of lighting units have the same current intensity, the processor 106 may determine to increase or decrease the intensity of the group synchronously based on their current intensity.

The lighting control device 120 may be any type of lighting control device (e.g. a light switch, a smartphone, smart glasses, a voice-controlled home assistant, etc.) comprising a user input element 122 configured to receive continuous user inputs indicative of a dimming command. The lighting control device 120 may be a light switch, and the continuous user input may be received by actuating and holding a button of the light switch. The button may, for example, be a press or touch button. Such a light switch 220a comprising a button 222a has been illustrated in FIG. 2. In another example, the lighting control device 120 may be a personal device, such as a smartphone, and the continuous user input may be received by actuating and holding a touch sensitive display 122 of the personal device. In another example, the lighting control device 120 may be an augmented reality (AR) device, and the continuous user input may be a gaze of a user towards a certain lamp, detected by for example a camera 112 comprised in the AR device. In another example, the lighting control device 120 may comprise an audio sensor 122, and the continuous user input may be a continuous sound created by the user, detected by the audio sensor.

The controller 102 comprises a communication unit 104 configured to receive a signal indicative of the continuous user input. In the example of FIG. 1a, wherein the lighting control device 120 and the controller 102 are comprised in separate devices, the communication unit 104 may be a receiver configured to receive (wireless) signals from the lighting control device 120. The receiver may be coupled to the processor 106 and communicate the received signals to the processor 106. In the example of FIG. 1b, wherein the controller 102 is comprised in the lighting control device 120, the communication unit 104 may for example be an input module of the processor 106 located between the user input element 122 and the processor 106.

In the example of FIG. 1a, wherein the lighting control device 120 and the controller 102 are comprised in separate devices, the communication unit 104 may comprise a transmitter for transmitting control commands to the lighting unit 110 to control the intensity of the light output of the lighting unit 110. In the example of FIG. 1b, wherein the controller 102 is comprised in the lighting control device 120, the processor 106 may (directly) control the intensity of the light output of the lighting unit 110.

The lighting unit 110 is configured to receive (wireless) signals (e.g. lighting control signals) from the controller 102. The (wireless) signals may be received directly from the controller 102 or via an intermediary device such as a bridge, a hub, a router, or another network device. The controller 102 may comprise a communication unit configured to communicate lighting control signals via any wired or wireless communication protocol (e.g. Ethernet, DALI, Bluetooth, Wi-Fi, Li-Fi, Thread, ZigBee, etc.). The lighting unit 110 may be an LED light bulb, an LED strip, a TLED, a light tile, etc.). The lighting unit 110 may comprise a control unit, such as a microcontroller (not shown), for controlling the light output generated by the lighting units based on received lighting control commands. A lighting control signal may comprise lighting control instructions for controlling the light output, such as the color, intensity, saturation, beam size, beam shape, etc. according to which the lighting unit 110 is controlled.

The processor 106 may be configured to access a memory configured to store a lookup table comprising associations between (current) intensity levels and an indication to increase or decrease the intensity. Table 1 illustrates an example of such a table. If, for example, the intensity level is 30% at the moment the user starts pressing the button, the processor 106 may determine to increase the intensity (e.g. until the user no longer provides the input (e.g. when the level is 90%, or all the way until 100%).

TABLE 1

| Current intensity | Intensity change |
| --- | --- |
| 0-25% | Increase intensity |
| 25-50% | Increase intensity |
| 50-75% | Decrease intensity |
| 75-100% | Decrease intensity |

The processor 106 may be further configured to determine/obtain a current time, and the current time may be a parameter used by the processor 106 to determine whether to increase or decrease the intensity of the light output of the lighting unit 110. The controller 102 may comprise an internal clock for providing the time to the processor 106. Alternatively, the processor 106 may receive the current time from an external clock (e.g. via a network via the communication unit 104). The current time may, for example, be a current time of day, a current day in the week, month or a current period/day of the year and/or a current season. Table 2 illustrates an example wherein both the current intensity and the current time are parameters used to determine whether to increase or decrease the intensity. If, for example, the intensity level is 30% and the time is 20:00 at the moment the user starts pressing the button, the processor 106 may determine to increase the intensity (e.g. until the user no longer provides the input (e.g. when the level is 90%), or all the way until 100%), but if the user would provide the same input at the same intensity level (30%) at a later time (e.g. 22:00), the processor 106 may determine to decrease the intensity (e.g. until the user no longer provides the input (e.g. when the level is 10%), or all the way until 0%).

TABLE 2

| Current intensity | Current time | Intensity change |
| --- | --- | --- |
| 0-25% | 18:00-21:00 | Increase intensity |
| 0-25% | 21:00-23:00 | Decrease intensity |
| 25-50% | 18:00-21:00 | Increase intensity |
| 25-50% | 21:00-23:00 | Decrease intensity |
| 50-75% | 18:00-21:00 | Increase intensity |
| 50-75% | 21:00-23:00 | Decrease intensity |
| 75-100% | 18:00-21:00 | Decrease intensity |
| 75-100% | 21:00-23:00 | Decrease intensity |

The processor 106 may be further configured to determine/obtain information about the location of the lighting unit 110, and the location may be a parameter used by the processor 106 to determine whether to increase or decrease the intensity of the light output of the lighting unit 110. The location of the lighting unit 110 may be obtained by the processor by accessing a memory storing information about the location of the lighting unit 110, by receiving information (via the communication unit 104) about the location of the lighting unit 110 from an (indoor) positioning system, by receiving information (via the communication unit 104) about the location of the lighting unit 110 from a central lighting control system (e.g. a bridge), etc. The location may, for example, be a geographical location, a location in a building (e.g. specific a room or space), a location in a room or a space (e.g. at the ceiling, on the floor, in a corner, in the center of a room, etc.), a location relative to another device or object (e.g. a tv, a table, etc.), etc. Table 2 illustrates an example wherein both the current intensity and the location are parameters used to determine whether to increase or decrease the intensity. If, for example, the intensity level is 30% at the moment the user starts pressing the button and the lighting unit 110 is located in the living room, the processor 106 may determine to increase the intensity (e.g. until the user no longer provides the input (e.g. when the level is 90%), or all the way until 100%), but if the user would provide the same input at the same intensity level (30%) for a lighting unit located in the bedroom, the processor 106 may determine to decrease the intensity (e.g.

until the user no longer provides the input (e.g. when the level is 10%, or all the way until 0%).

TABLE 3

| Current intensity | Location | Intensity change |
| --- | --- | --- |
| 0-25% | Living room | Increase intensity |
| 0-25% | Bedroom | Decrease intensity |
| 25-50% | Living room | Increase intensity |
| 25-50% | Bedroom | Decrease intensity |
| 50-75% | Living room | Increase intensity |
| 50-75% | Bedroom | Decrease intensity |
| 75-100% | Living room | Decrease intensity |
| 75-100% | Bedroom | Decrease intensity |

In the examples of Tables 2 and 3, two parameters are mentioned. It should be understood that the processor 106 may be configured to take more than two parameters (e.g. the current intensity, the location and the current time) into account to determine whether to increase or decrease the intensity of the light output of the lighting unit 110. Examples of other parameters include but are not limited to the current weather information (e.g. uncloudy vs cloudy, which information may be obtained from a weather application), temperature information (which may be obtained from a temperature sensor), occupancy information (e.g. a single person vs multiple people, which may be detected by a camera or other presence sensor), information indicative of an activity of the user operating the lighting control device 120 (which information may for example be detected by a camera, a wearable device, etc.), current light intensities of one or more further lighting units, etc. It should be understood that the above-mentioned lookup tables are mere examples for the processor 106 to determine whether to increase or decrease the intensity, and that the skilled person is able to design alternatives (algorithms) for determining whether to increase or decrease the intensity based on the one or more parameters, without departing from the scope of the appended claims.

Figure 2:
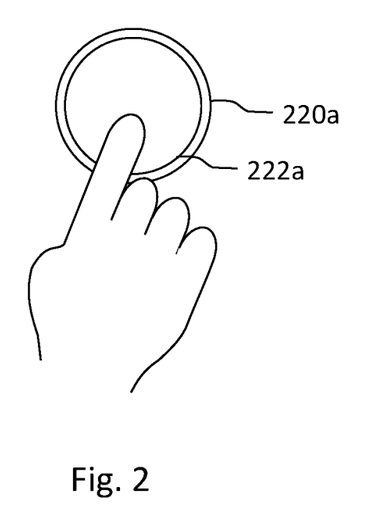
FIG. 2 shows schematically an example of a lighting control device.

The processor 106 may be further configured to cease increasing or decreasing the intensity when the continuous user input is no longer being provided. In other words, when the user stops providing the continuous input (e.g. by releasing a button 222a of a light switch 220a) at a certain intensity (e.g. at 40%), the processor 106 may set the intensity of the light output of the lighting unit 110 to that intensity (e.g. 40%).

The processor 106 may be further configured to, when the intensity reaches the predefined maximum intensity level while the continuous user input is being provided, to start decreasing the intensity over time while the continuous user input is being provided. If, for example, the intensity is being increased, and the predefined maximum intensity is reached, the processor 106 may start decreasing the intensity. This enables a user to cycle through the dimming levels by providing the continuous user input.

The processor 106 may be further configured to, when the intensity reaches the predefined minimum intensity level while the continuous user input is being provided, start increasing the intensity over time while the continuous user input is being provided. If, for example, the intensity is being decreased, and the predefined minimum intensity is reached, the processor 106 may start increasing the intensity. This enables a user to cycle through the dimming levels by providing the continuous user input.

Figure 3:
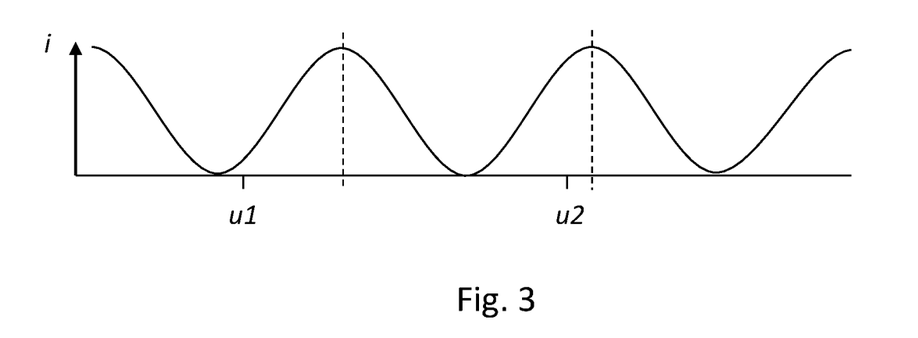
FIG. 3 shows schematically a dimming curve.

The increase or decrease of the intensity of the light output over time may be linear, exponential, etc. The increase or decrease of the intensity of the light output over time may be based on a light intensity profile. The light intensity profile may, for example, be a dimming curve defining a plurality of dimming values, according to which the lighting unit may be controlled. FIG. 3 illustrates an example of a light intensity profile. A user may, for example, provide the continuous user input u1 when the current intensity i is approximately 10%. Based thereon, the processor 106 may determine to start increasing the intensity over time while the user in providing the continuous user until the peak (the maximum intensity) of the curve has been reached. The processor 106 may then determine to reduce the intensity while the user is providing the continuous user input. In another example, a user may, for example, provide the continuous user input u2 when the current intensity i is approximately 90%. Based thereon, the processor 106 may determine to start decreasing the intensity over time while the user in providing the continuous user until the bottom of the curve (the minimum intensity) has been reached. The processor 106 may then determine to increase the intensity while the user is providing the continuous user input. In the example of FIG. 3 the curve is symmetrical and repetitive. The curve, however, may be asymmetrical and comprise different maxima, minima, and slopes according to which the lighting unit 110 may be controlled over time while the user is providing the continuous user input.

A user may stop providing the continuous user input and provide a subsequent second continuous user input within a predefined time period after the (first) continuous user input. The processor 106 may be configured to receive a second signal indicative of the second continuous user input received via the same user input element. The processor 106 may be further configured to increase the intensity, if the intensity was being decreased while the continuous user input was being provided, over time while the second continuous user input is being provided. The processor 106 may be further configured to decrease the intensity, if the intensity was being increased while the continuous user input was being provided, over time while the second continuous user input is being provided. For instance, referring to FIG. 3, the processor 106 may control the intensity of the light output of the lighting unit 110 according to the curve while the continuous user input is being received, and control the intensity of the light output of the lighting unit 110 in the opposite direction of the curve while the second continuous user input is being received.

The predefined minimum and maximum intensity levels may be minimum and maximum intensity levels that can be provided by the lighting unit 110. The predefined maximum intensity may, for example, be a 100% intensity, and the predefined minimum intensity may, for example, be off. In another example, the predefined minimum and maximum intensity levels may be based on a light intensity profile (e.g. the curve shown in FIG. 3). The light intensity profile may, for example, be a dimming curve defining a plurality of dimming values, according to which the lighting unit may be controlled. In another example, the predefined minimum and maximum intensity levels may be minimum and maximum intensity levels of an active light scene. The light scene may be a set of light settings for a plurality of lighting units, wherein the plurality of lighting units are controlled according to a set of rules (e.g. a set of colors, a minimum and maximum intensity, etc.). these rules may indicate the minimum and maximum intensity levels.

The processor 106 may be further configured to enter a learning mode to learn, over a period of time, associations between user inputs indicative of changes of the intensity of the light output of one or more lighting units and one or more current parameters. In other words, user preferences related to parameters (e.g. current light settings, time of day, location of the lighting units, etc.) and lighting control provided by users related to increasing or decreasing the intensity may be monitored during a monitoring/learning period. The processor 106 may use machine learning algorithms to learn these user preferences. Such algorithms are known in the art and will therefore not be discussed in detail. The user preferences may then be used to determine whether to increase or decrease the intensity of the light output when the processor 106 has been set to the control mode.

Figure 4:
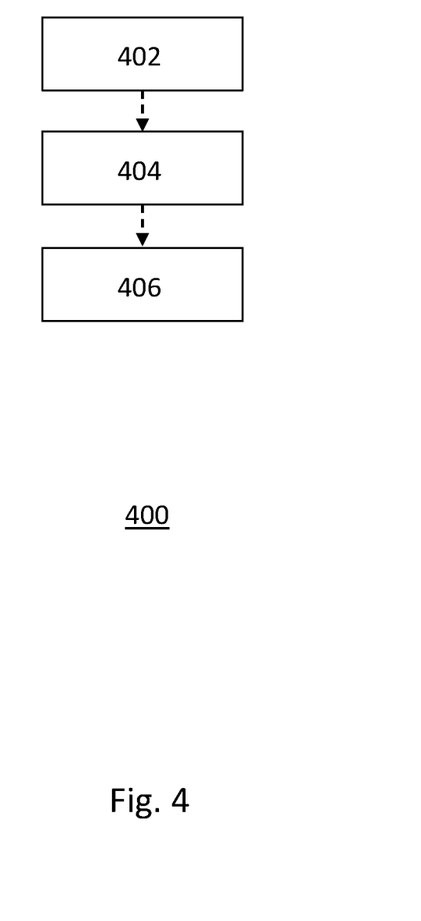
FIG. 4 shows schematically a method of controlling a lighting unit of a lighting system.

FIG. 4 illustrates a method of controlling a lighting unit 110 of a lighting system 100a, 100b, the lighting system comprising the lighting unit 110 and a lighting control device 120 comprising a user input element 122 for receiving a continuous user input for changing an intensity of the light output of the lighting unit 110, the method 400 comprising: receiving 402 a signal indicative of the continuous user input, obtaining 404 one or more parameters, the one or more of parameters comprising at least a current light setting of the lighting unit, the current light setting having an intensity level between a predefined maximum intensity level and a predefined minimum intensity level, and control 406 the intensity of the light output of the lighting unit over time while the continuous user input is being provided, wherein the intensity of the light output is either increased or decreased over time based on the one or more parameters.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a lighting unit of a lighting system, the lighting system comprising the lighting unit and a lighting control device, wherein the lighting control device includes a single input button and receives, via the single input button, a continuous user input for changing an intensity of the light output of the lighting unit, the method comprising:
   receiving, via a communication unit, a signal indicative of the continuous user input from the lighting control device without an indication of an increase or decrease in light output of the lighting unit,
   obtaining parameters, by a processor, from a memory location in the lighting system or the lighting unit, the parameters comprising at least a current light setting of the lighting unit and a current time of day, the current light setting having an intensity level between a predefined maximum intensity level and a predefined minimum intensity level,
   determining by the processor, whether to increase or decrease the intensity based on, at least in part, the one or more parameters comprising at least the current light setting of the lighting unit and the current time of day, and
   controlling, by the processor, the intensity of the light output of the lighting unit over time while the continuous user input is being provided, wherein the intensity of the light output is either increased or decreased based on the determination.

2. The method of claim 1, wherein the parameters further comprise a location of the lighting unit.

3. The method of claim 1, wherein the parameters further comprise one or more light current light intensities of one or more further lighting units.

4. The method of claim 1, further comprising ceasing increasing or decreasing the intensity when the continuous user input is no longer being provided.

5. The method of claim 1, wherein the method comprises:
   when the intensity reaches the predefined maximum intensity level while the continuous user input is being provided, decreasing the intensity over time while the continuous user input is being provided, and
   when the intensity reaches the predefined minimum intensity level while the continuous user input is being provided, increasing the intensity over time while the continuous user input is being provided.

6. The method of claim 1, further comprising, when the continuous user input is no longer received:
   receiving, by the processor, a second signal indicative of a second continuous user input received via the same single input button, and
   if the intensity was being decreased while the continuous user input was being provided, increasing the intensity over time while the second continuous user input is being provided, and
   if the intensity was being increased while the continuous user input was being provided, decreasing the intensity over time while the second continuous user input is being provided.

7. The method of claim 1, wherein the predefined minimum and maximum intensity levels are minimum and maximum intensity levels of the lighting unit.

8. The method of claim 1, wherein the predefined minimum and maximum intensity levels are based on a light intensity profile.

9. The method of claim 1, wherein the method further comprises:
- entering, by the processor, a learning mode, to learn, over a period of time, associations between user inputs indicative of changes of the intensity of the light output of one or more lighting units and one or more current parameters,
- switching, by the processor, to a control mode, and
- executing the steps of the method of claim 1, wherein the method further comprises: determining whether to increase or decrease the intensity of the light output based on the learned associations.

10. The method of claim 1, wherein the lighting control device-is a light switch, and the continuous user input is received by actuating and holding a button of the light switch.

11. A non-transitory computer program product for a computing device, the computer program product comprising computer program code to perform the method of claim 1 when the computer program product is run on a processing unit of the lighting system or lighting unit.

12. The method of claim 1, wherein the lighting control device comprises a virtual button on a touch sensitive display.

13. The method of claim 12, wherein the touch sensitive display is part of a personal device.

14. A controller for controlling a lighting unit of a lighting system, the lighting system comprising the lighting unit and a lighting control device, wherein the lighting control device includes a single input button and receives, via the single input button a continuous user input for changing an intensity of the light output of the lighting unit, the controller comprising:
- a communication unit, wherein the communication unit receives a signal indicative of the continuous user input from the lighting control device without an indication of an increase or decrease in light output of the lighting unit,
- a processor configured to control the intensity of the light output of the lighting unit, wherein the processor is further configured to:
- obtain parameters, from a memory location in the lighting system or the lighting unit, the parameters comprising at least a current light setting of the lighting unit and a current time of day, the current light setting having an intensity level between a maximum intensity level and a minimum intensity level of the lighting unit,
- determine whether to increase or decrease the intensity based on the one or more parameters comprising at least the current light setting of the lighting unit and the current time of day, and
- controlling the intensity of the light output of the lighting unit over time while the continuous user input is being provided, wherein the intensity of the light output is either increased or decreased based on the determination.

15. The controller of claim 14, wherein the controller is comprised in the lighting control device.

* * * * *